United States Patent
Kaiser et al.

(10) Patent No.: US 6,615,408 B1
(45) Date of Patent: Sep. 2, 2003

(54) METHOD, SYSTEM, AND APPARATUS FOR PROVIDING ACTION SELECTIONS TO AN IMAGE REFERENCING A PRODUCT IN A VIDEO PRODUCTION

(75) Inventors: David H. Kaiser, Hillsborough, CA (US); Todd Lash, Oakland, CA (US); Jay C. Weber, Menlo Park, CA (US)

(73) Assignee: Grischa Corporation, Hillsborough, CA (US)

( * ) Notice: Subject to any disclaimer, the term of this patent is extended or adjusted under 35 U.S.C. 154(b) by 0 days.

(21) Appl. No.: 09/231,283

(22) Filed: Jan. 15, 1999

(51) Int. Cl.[7] .................. H04N 7/173; H04N 7/025; H04N 7/10; H04N 5/445; G06F 3/00; G06F 13/00

(52) U.S. Cl. .............. 725/112; 725/113; 725/32; 725/34; 725/60

(58) Field of Search ................ 725/112, 113, 725/60, 34, 32

(56) References Cited

U.S. PATENT DOCUMENTS

| | | |
|---|---|---|
| 4,573,072 A | 2/1986 | Freeman |
| 4,602,279 A | 7/1986 | Freeman |
| 4,847,698 A | 7/1989 | Freeman |
| 4,918,516 A | 4/1990 | Freeman |
| 5,534,911 A | 7/1996 | Levitan |
| 5,537,141 A | 7/1996 | Harper et al. |
| 5,585,858 A | 12/1996 | Harper et al. |
| 5,632,007 A | 5/1997 | Freeman |
| 5,682,196 A | 10/1997 | Freeman |
| 5,686,902 A | 11/1997 | Reis et al. |

(List continued on next page.)

FOREIGN PATENT DOCUMENTS

| | | |
|---|---|---|
| EP | 0596823 A2 | 5/1994 |
| EP | 0 596 823 A2 | 5/1994 |
| EP | 0 810 790 A2 | 12/1997 |
| EP | 0810790 A2 | 12/1997 |
| EP | 0917380 A2 | 5/1999 |

(List continued on next page.)

OTHER PUBLICATIONS

Zigmond, et al., "Linking Television to the Internet: EIA–746 and Beyond", WebTV Networks, Inc. IEEE, 1998, pp. 282–283.

(List continued on next page.)

*Primary Examiner*—John Miller
*Assistant Examiner*—Michael W Hoye
(74) *Attorney, Agent, or Firm*—Blakely, Sokoloff, Taylor & Zafman, LLP

(57) ABSTRACT

Disclosed are a method, apparatus and system for providing action selections to an image referencing a product in a video production. According to the disclosure a method for providing action selections to an image referencing a product in a video production, said method includes (1) communicating a video production to a reproducing apparatus, said video production comprising a placement zone and a trigger zone at least partially coincident with said placement zone, wherein said trigger zone comprises a trigger resource identifier, and wherein said placement zone comprises an image referencing a product; (2) communicating to said reproducing apparatus an indication that an action selection interface associated with said product is available in response to a request corresponding to said trigger; and (3) communicating to said reproducing apparatus a characterization of said action selection interface, wherein said action selection interface comprises a selectable action. An apparatus according to the invention may include a server programmed to interact and provide action resources to. A system according to the disclosure may include the facility communicating the video production to the reproducing apparatus which sends a request to the server which provides action resources.

16 Claims, 11 Drawing Sheets

U.S. PATENT DOCUMENTS

| | | | |
|---|---|---|---|
| 5,708,845 A | | 1/1998 | Wistendahl et al. |
| 5,724,091 A | | 3/1998 | Freeman et al. |
| 5,740,549 A | * | 4/1998 | Reilly et al. .................. 705/14 |
| 5,745,360 A | | 4/1998 | Leone et al. |
| 5,751,956 A | | 5/1998 | Kirsch |
| 5,758,057 A | | 5/1998 | Baba et al. |
| 5,760,838 A | | 6/1998 | Adams et al. |
| 5,761,606 A | | 6/1998 | Wolzien |
| 5,774,664 A | * | 6/1998 | Hidary et al. ............... 725/109 |
| 5,774,666 A | * | 6/1998 | Portuesi ..................... 348/473 |
| 5,774,670 A | | 6/1998 | Montulli |
| 5,778,181 A | | 7/1998 | Hidary et al. |
| 5,794,207 A | | 8/1998 | Walker et al. |
| 5,812,769 A | | 9/1998 | Graber et al. |
| 5,812,776 A | | 9/1998 | Gifford |
| 5,818,441 A | | 10/1998 | Throckmorton et al. |
| 5,818,935 A | | 10/1998 | Maa |
| 5,848,396 A | * | 12/1998 | Gerace .......................... 705/1 |
| 5,861,881 A | | 1/1999 | Freeman et al. |
| 5,864,604 A | | 1/1999 | Moen et al. |
| 5,864,823 A | | 1/1999 | Levitan |
| 5,907,322 A | | 5/1999 | Kelly et al. |
| 5,929,849 A | * | 7/1999 | Kikinis ....................... 345/700 |
| 5,964,829 A | | 10/1999 | Ozden et al. |
| 5,978,817 A | | 11/1999 | Giannandrea et al. |
| 5,987,509 A | * | 11/1999 | Portuesi ..................... 348/564 |
| 6,012,080 A | | 1/2000 | Ozden et al. |
| 6,018,768 A | * | 1/2000 | Ullman et al. .............. 709/218 |
| 6,064,438 A | | 5/2000 | Miller |
| 6,070,191 A | | 5/2000 | Narendran et al. |
| 6,154,738 A | | 11/2000 | Call |
| 6,240,555 B1 | | 5/2001 | Shoff et al. |
| 6,496,981 B1 | * | 12/2002 | Wistendahl et al. ........ 725/112 |

FOREIGN PATENT DOCUMENTS

| | | |
|---|---|---|
| WO | WO 97/41654 | 6/1997 |
| WO | WO 97/33434 | 9/1997 |
| WO | WO 97/38529 | 10/1997 |
| WO | WO 97/41690 | 11/1997 |
| WO | WO 97/47143 | 12/1997 |
| WO | WO 98/17064 | 4/1998 |
| WO | WO 98/26541 | 6/1998 |
| WO | WO 98/27441 | 6/1998 |

OTHER PUBLICATIONS

Pending Application: Serial No. 09/232,750 entitled: "Method Apparatus and System for Indexical Triggers in Enhanced Video Productions", filed Jan. 15, 1999.

Search Report of a Corresponding PCT Application PCT/US00/00017.

Simonson, J. et al: "Version augmented URIs for reference permanencevia [sic]an Apache module design" Computer Networks and ISDN Systems, NL, North Holland Publishing, Amsterdam, vol. 30, No. 1–7, Apr. 1, 1998.

Rio, M. et al: "A framework for broadcasting and mangement of URIs" Computer Networks and ISDN Systyems, NL, North Holland Publishing, Amsterdam, vol. 28, No. 4, Feb. 1, 1996.

"Interactive Television & WebTV® Plus;" retrieved 11/98; retrieved from Internet <http://developer.webtv.net/docs/ITV/ITV.html>.

"Interactive Television Programming Examples;" retrieved 11/98; retrieved from Internet <http://developer.webtv.net/docs/ITV/examples.html>.

"Embedding and Overlaying Web Pages in a TV Broadcasat;" retrieved from Internet <http://developer.webtv.net/docs/ITV/tvURL.html>.

"Uniform Resource Locators for Television Broadcasts," retrieved 11/98; retrieved from Internet <http://developer.web.tv.net/docs/ITV/draft–zigmond–tv–url–00.txt>.

"Interactive Television Links;" retrieved 11/98; retrieved from Internet <http://developer.webtv.net/docs/ITV/links.html>.

* cited by examiner

METHOD, SYSTEM, AND APPARATUS FOR PROVIDING ACTION SELECTIONS TO AN IMAGE REFERENCING A PRODUCT IN A VIDEO PRODUCTION

CROSS-REFERENCES

This application is related to an application entitled, "A Method, Apparatus, and System for Indexical Triggers in Enhanced Video Productions," application Ser. No. 09/232,750, filed concurrently herewith, and which is incorporated herein in its entirety by this reference.

BACKGROUND

1. Field

The invention relates generally to interactive video and more particularly to video operable with networked action resources.

2. Background

Purveyors of products generally wish to make information relating to their products available to prospective purchasers. It is particularly desirable to provide interactive information about a product. Interactive information allows a prospective purchaser to better receive desired information about a product, participate in interactive events respecting the product, and, of course, purchase the product. Typically interactive information also provided the added convenience to prospective purchasers of not having to transcribe access information in connection with product purchases.

At a minimum, however, purveyors of products frequently wish to make an image referencing their product present in a video production. It is frequently desired that the purveyor be able to select appropriate contexts in the video production for display of an image referencing their product in order develop or maintain the distinctive quality of the image referencing their product(s) and promote contextually-driven positive associations with their product (s). Both qualitative and quantitative factors are frequently contextually relevant. Conventionally, purveyors of products arrange with authors of a video production to include a "product placement" in the video production. However, conventional product placements are unable to support interactive behavior.

A related technique for providing interactive behavior in a video production is to display a locator for a networked resource in a video production as is described, for example, in U.S. Pat. No. 5,774,666 issued to Portuesi. Techniques similar to this may not provide a desired level of consumer acceptance in practice. Display of a locator for a networked reference may unnecessarily clutter a viewer's display. In addition, the locator may be unrecognizable by a viewer as being associated with any particular subject matter displayed on the viewer's display because of the frequently lengthy and confusing syntax of uniform network resource locators. A variation of this technique is to use so-called "hot spots." However this, too, only provides active regions on a display and a viewer may need to consult the uniform network resource locator displayed when the hot spot is active which, again, are frequently lengthy and confusing to understand, and needlessly distracting. Rather it would be desirable to have a solution in which images easily recognizable by a viewer as referencing a product could be used.

Another conventional solution is to provide a video production dedicated to providing information about a product. This solution may be unsatisfactory for several reasons. First it may be excessively costly. Creation of the video production dedicated to providing information about a product requires all the costs incurred in producing any video production which will be far beyond the resources of many vendors. Furthermore, when as brief as a conventional commercial, it is of insufficient duration to support rich or involved interactive features which may be a necessity to effectively compete in the marketplace. Second, this solution is frequently deficient in reaching a wide audience of prospective purchasers. Typically, the audience of the video production dedicated to providing information about a product is limited to a small segment of the potential market for who the opportunity cost of viewing the dedicated video production is quite low. By contrast, video productions of primarily entertainment value can draw large audiences. Third, there is limited availability for commercially desirable broadcasting times for a video production dedicated to providing information about a product as the commercially desirable broadcasting times conventionally are reserved for video productions of primarily entertainment value. Using conventional interactive television techniques with the video production dedicated to providing information about a product cannot eliminate these drawbacks.

It is therefore desirable that a system and method exist that allows interactive product behavior to be provided to an image referencing a product in a video production, that provides purveyors with the flexibility to select contextually appropriate segments of a video production for interactive behavior, that operates with images referencing products and other symbols easily recognizable by a viewer, that is cost effective, and that operates with video productions of the type conventionally found in commercially desirable time slots.

SUMMARY

In order to provide these and other desired features, the instant invention provides a method and system for providing action selections to an image referencing a product in a video production.

A method conforming with the invention may included, at least communicating a video production to a reproducing apparatus, the video production including, at least, a placement zone and a trigger zone at least partially coincident with the placement zone, wherein the trigger zone includes, at least, a trigger resource identifier, and wherein the placement zone includes, at least, an image referencing a product; communicating to the reproducing apparatus an indication that an action selection interface associated with the product is available in response to a request corresponding to the trigger; and communicating to the reproducing apparatus a characterization of the action selection interface, wherein the action selection interface comprises a selectable action. A conforming method may also further include, at least: receiving an indication of the selection of the selectable action; retrieving an action resource associated with the selectable action; and communicating the action resource to the reproducing apparatus. The action resource may be selected responsive to a profile of a user associated with the reproducing apparatus.

The video production may be provided in serval ways including, for example. communicated over a television network, distributed in a tangible medium, or transferred over a computer network.

The indication of the action selection interface may take many forms including, for example, a visual highlight. In some conforming methods, when the reproducing apparatus is coupled to a viewing device, the visual highlight is communicated to the viewing device only if the reproducing apparatus supports the action selection interface.

Selectable actions for use with a conforming method include for example, a product purchase action, a promotion participation action, or a information request action.

A method for creating a video production including a placement zone and a trigger zone and comprising an image referencing a product and having a selectable action available for communication to a reproducing apparatus according to the invention may include, at least: selecting a placement zone in a video production, the placement zone comprising an image referencing a product; selecting a trigger zone in the video production corresponding to the placement zone; embedding a reference in the trigger zone in said video production to an action selection interface, wherein when reproduced on compatible equipment and communicated to a display, a selectable action in the action selection interface is selectable by a viewer. The video production may include, at least, a first track including, at least, the trigger zone and a second track including, at least, the placment zone, wherein the first and second tracks are synchronized.

An apparatus with a processor, a memory, and an input-output system and configured for communication with a reproducing apparatus via a data network may also embody aspects of the invention. Programmed instructions may configure the apparatus to perform a method including at least receiving a request from a reproducing apparatus, said request corresponding to a trigger from a trigger zone in a video production communicated to the reproducing apparatus; determining whether an action selection interface associated with said request is available; and communicating a characterization of the action selection interface to the reproducing apparatus.

A system for providing action selections to an image referencing a product in a video production and operable for use with a reproducing apparatus configured for communication with a display, a data network, and a selection device may also conform to the invention. The system may include, at least, a video production communication device, that can communicate a video production comprising a placement zone and a trigger zone to the reproducing apparatus; and an action resource provider configured for communication with the reproducing apparatus via the data network, the action resource provider receiving a request from the reproducing apparatus corresponding to a trigger in the trigger zone of the video production, the action resource communicating a characterization of an action selection interface to the reproducing apparatus responsive to the request, the action selection interface comprising a selectable action. In such a system, the action resource provider may further receive a request from the reproducing apparatus corresponding to the selectable action; retrieve an action resource associated with the selectable action; and communicate an action resource associated with the selectable action to the reproducing apparatus.

BRIEF DESCRIPTION OF THE DRAWINGS

These and other features, aspects, and advantages of the present invention will become better understood with regard to the following description, appended claims, and accompanying drawings where:

DETAILED DESCRIPTION

Notations and Nomenclature (1) http://<server name>/<videoprod>/<position>
(2) Action Selection Interface is abbreviated "ASI"
(3) "Product." As used herein, the term "product" includes, at least, goods, services, collective entities, and certifications.

DESCRIPTION OF FIGURES

While this invention is susceptible of embodiment in many different forms, there are described herein in detail illustrative embodiments with the understanding that the present disclosure is to be considered as an example of the principles of the invention and is not intended to limit the invention to the embodiments illustrated.

Figure 1:
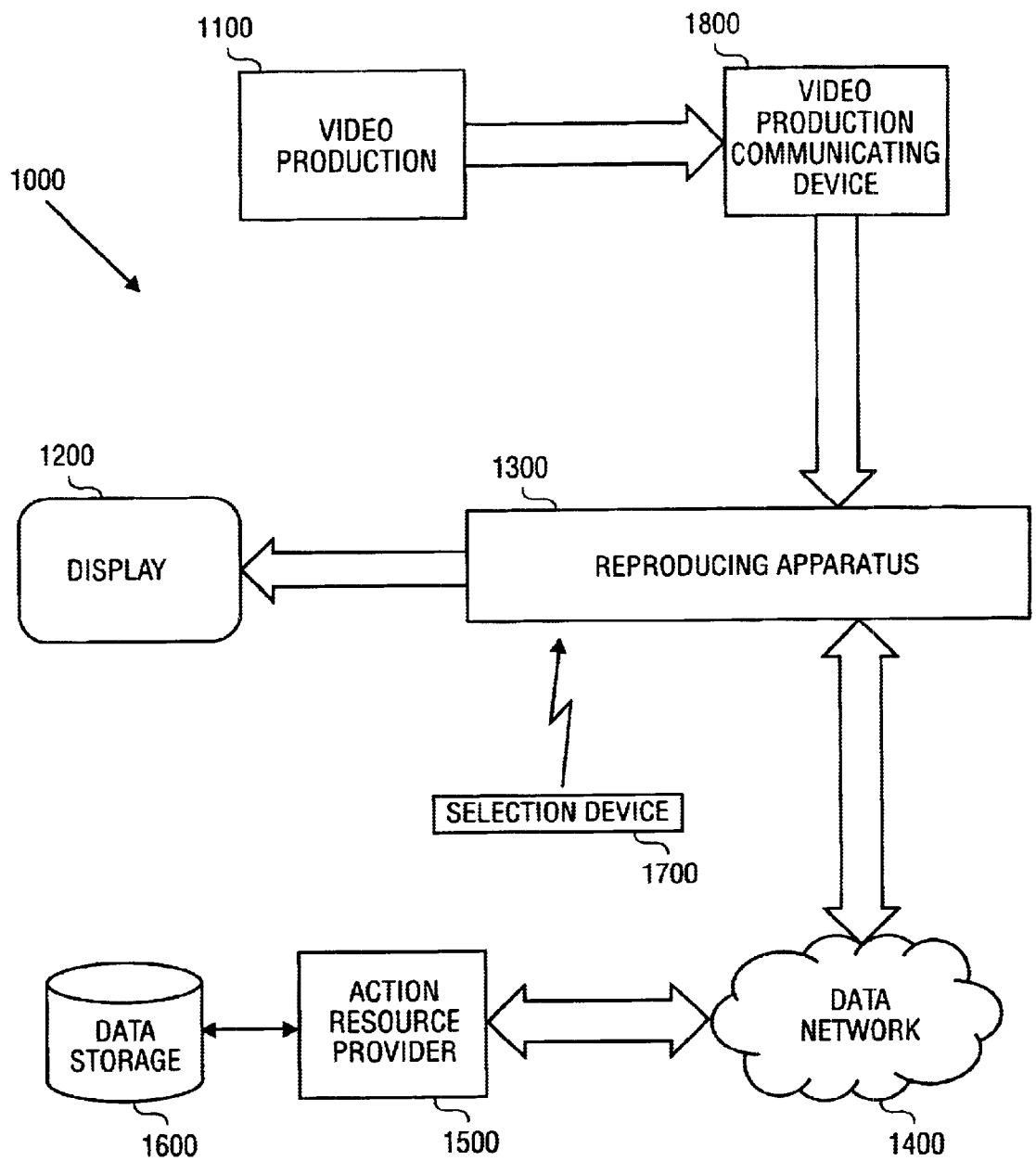
FIG. 1 is a block diagram showing elements used with a system for providing action selections to an image referencing a product in a video production in accordance with an illustrative embodiment.

FIG. 1 shows a block diagram of the system elements 1000 used in conjunction with an illustrative embodiment. In operation, a video production 1100 is provided to a video production communicating device 1800 which communicates the video production 1100 to a reproducing apparatus 1300. The video production 1100 is described in greater detail in connection with FIG. 2 and the reproducing apparatus 1300 is described in greater detail in connection with FIG. 3.

The video production 1100 may be in a tangible medium, including, for example, video tape, video disc, or digital video disc (DVD). In some embodiments the video production 1100 is transferred over a computer network. The video production 1100 could be streamed or all, or substantially all, of a file comprising the video production 1100 could be transferred before reproduction begins.

The video production communicating device 1800 generates an output operable with the reproducing apparatus 1300 from the video production 1100. For example, if the video production 1100 were by DVD, the video production communicating device 1800 could be a conventional DVD player; if the video production 1100 were transferred over a computer network, the video production communicating device 1800 could be a programmed computer. In some embodiments the video production communicating device 1800 may be a broadcast station, either terrestrial or orbiting. One of skill in the art will recognize which structures, for example the DVD player or programmed computer, are suitable to operate with the video production 1100 depending on its form.

In an illustrative embodiment the video production 1100 is communicated to the reproducing apparatus 1300 with a broadcast network and the video production communicating device 1800 is conventional broadcasting hardware. In a more preferred embodiment the broadcast network is a television network; in a still more preferred embodiment, the video production is broadcast as a National Television Standards Committee ("NTSC") video signal; PAL, SECAM, or high-definition television formats could also be used.

Generally, the reproducing apparatus 1300 is capable of receiving the video production communicated by the video production communicating device 1800 and reproducing an video signal comprising the video production to, for example, a display 1200. In addition, generally, the reproducing apparatus 1300 may operate as a client in client-server communications. Also, a selection device 1700 typically operates with the reproducing apparatus 1300 and allows a user (not shown) to select among selectable actions rendered on the display 1200. As one of skill in the art will recognize, the particular form that the selection device 1700 takes may vary with the reproducing apparatus 1300.

The reproducing apparatus 1300 communicates over a data network 1400. The data network 1400 may be the same or a separate transmission medium as that though which the video production communicating device 1800 communicates the video production 1100 to the reproducing apparatus 1300, including, for example, a computer network or broadcast. In the illustrative embodiment, the data network is the internet; preferably the hypertext transfer protocol (HTTP) is used. The data network 1400 may, more generally, include other forms of data communication.

Configured for communication with the reproducing apparatus 1300 via the data network 1400 is an action resource provider 1500. The action resource provider 1500 provides action resource data to the reproducing apparatus 1300. Action resource data, generally, may include instructions, such as HTML, XML, or SGML pages; scripts, programs, and analogous instructing informational languages which when parsed and rendered on suitable equipment provide for interaction. Typically action resource data includes a characterization of an interface. The interface results from suitable equipment parsing and rendering the characterization. In an illustrative embodiment, the action resource provider 1500 is an HTTP server. However, one skilled in the art will appreciate that the action resource provider 1500 could be other devices capable of communicating action resources with which the reproducing apparatus 1300 is configured to operate. In the illustrative embodiment the action resource provider 1500 communicates with a data storage 1600. The data storage 1600 may store, for example, user profile data, product data, merchant data logs, or program guides.

Figure 2:
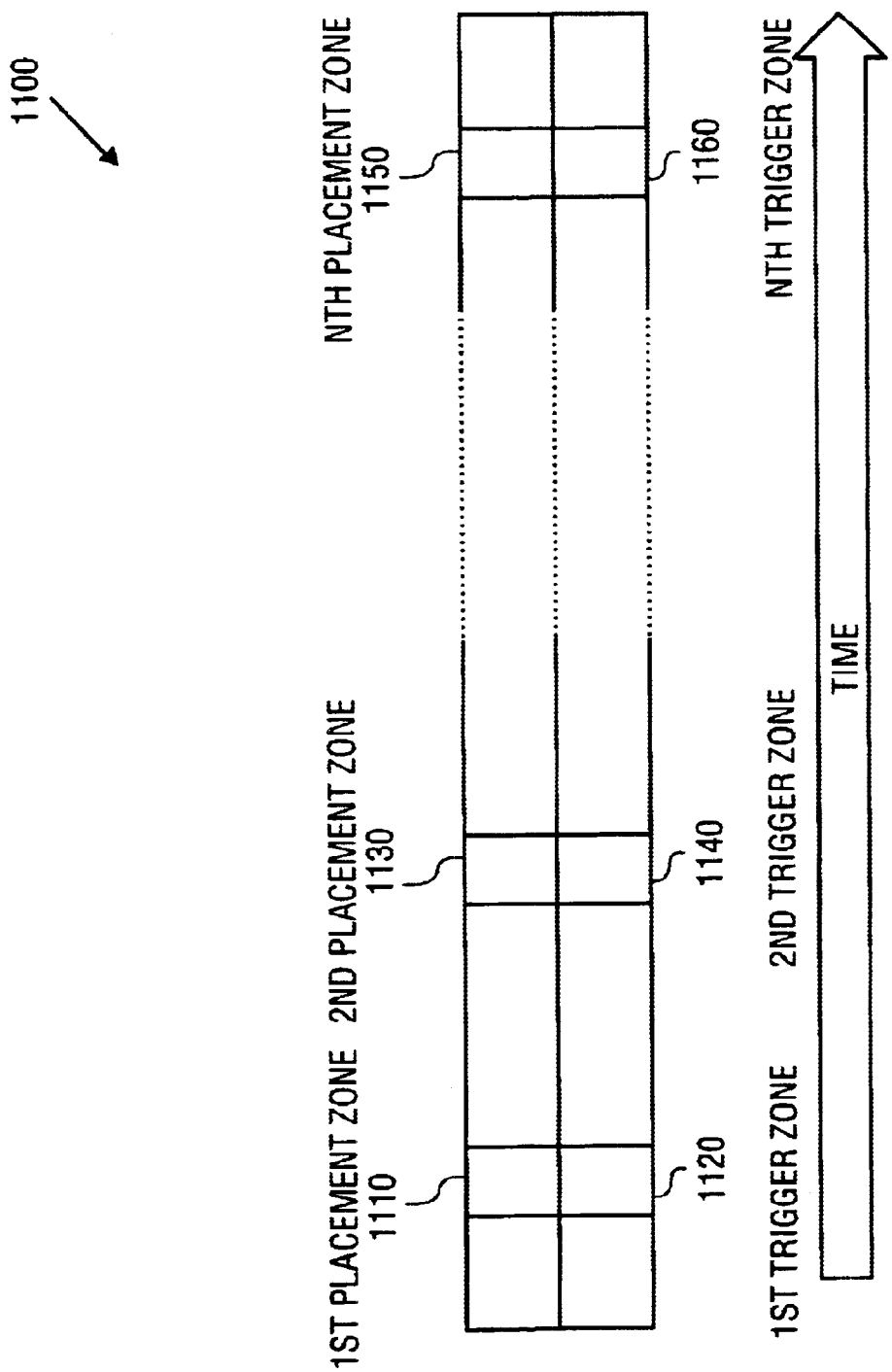
FIG. 2 depicts a video production with placement zones and trigger zones in accordance with an illustrative embodiment.

FIG. 2 depicts a representation of a video production 1100. Shown are a first placement zone 1110, a second placement zone 1130, and a Nth placement zone 1150 which correspond, respectively, to a first trigger zone 1120, a second trigger zone 1140, and a Nth trigger zone 1160. The video production 1100 is not limited in the number of placement zones or trigger zones and N may be arbitrarily large or small. The trigger zones need not be precisely coincident with the placement zones.

In an illustrative embodiment, a placement zone comprises one or more frames of a video production, the one or more frames comprising an image referencing a product. The number of frames in the placement zone is not limited other than relative to the video production itself. As depicted in FIG. 2, the first placement zone 1110, the second placement zone 1130, and the Nth placement zone 1150 are disjoint. However, this is not fundamental to the invention and, for example, the first placement zone 1110 and the second placement zone 1130 could overlap. In the case of an overlap, plural products could be referenced by the image or images. One skilled in the art will further appreciate that a conventional video production may have one or more placement zones inherent in its layout while, also, placement zones may be added to a conventional video production using well-known editing techniques.

Within a trigger zone, for example, the first trigger zone 1120 are one or more triggers. In an illustrative embodiment, triggers are compliant with the CEMA EIA-746 standard or analogous standard. A trigger comprises a resource identifier. In the illustrative embodiment, the resource identifier is a Uniform Resource Identifier (URI) of the form:

$$\text{http://<server name>/<videoprod>/<position>} \quad (1)$$

The material denoted within angle-brackets < > are denote names of quantities used in accordance with an illustrative embodiment. In (1) above, <server name> may be any server addressable on the data network 1400, including, for example, the action resource provider 1500, conveniently, the server may be a dedicated server. <videoprod> refers to an identifier of the video production 1100 (or a segment thereof) into which a trigger is embedded. Conveniently, the <videoprod> is not temporally unique. i.e., the video production and embedded trigger may be distributed at abribtrary or multiple times. Triggers may also be indexical as described in a patent application entitled "A Method, Apparatus, and System for Indexical Triggers in Enhanced Video Productions," application Ser. No. 09/232,730, filed concurrently herewith. <position> refers to a position within the video production 1100, exemplary positions may be the first trigger zone 1120 or the Nth trigger zone 1160. In the illustrative embodiment, positions may be either temporally indexed or indexed by segments of the video production 1100. More generally, a trigger resource identifier could identify other resources addressable in a client-server data communications network.

Conveniently, a trigger may be embedded in the Text-2 service of line 21 of the Vertical Blanking Interval of an analog television signal as specified in CEMA standard EIA-746 available from The Electronic Industries Association of Arlington, Va., U.S.A. Conventional closed-captioning equipment may be used to embed triggers in accordance with the CEMA standard.

One aspect of the invention is the portion of the video production 1100 which is spanned by placement zones or trigger zones. Conventionally, many video productions are viewed primarily for entertainment purposes. It is undesirable for one or more images referencing one or more products to be the dominant images or dominant subject matter in a video production viewed for such purposes. In such a situation, a viewer of the video production may find non-dominant images of insufficient interest to retain viewership, possibly frustrating viewer expectations and forgoing the possibility of selection of selectable actions from an action selection interface made available through the video production.

In one embodiment of the invention the placement zones for a given product in a video production according to the invention are less than 50% of the viewable time of the video production. Alternative embodiments may use, for example, less than 40%, 33%, 25%, 20%, 10%, or 5%. A placement zone may span a single segment in a video production. Shares of the total viewable time of the video production corresponding to one of a number of segments may thus also be used, including, for example (1/6) or about 15%. As one of skill in the art will appreciate having the benefit of this disclosure, a placement zone according to the invention will have some portion of the viewable time of the video production.

Figure 3:
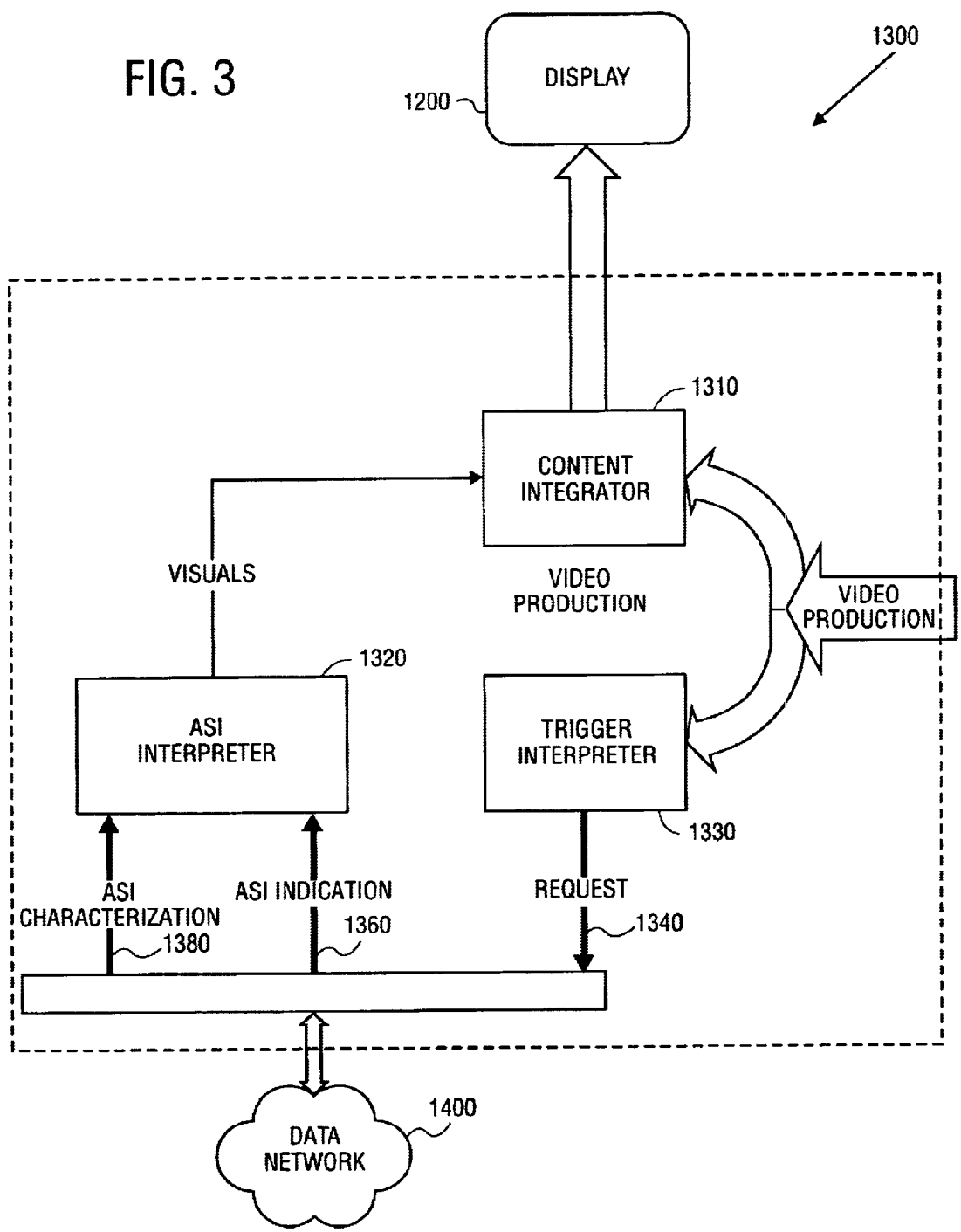
FIG. 3 depicts a reproducing apparatus in accordance with an illustrative embodiment.

The video production 1100 operates with the reproducing apparatus 1300 which described in greater detail below with reference to FIG. 3. As noted above, the reproducing apparatus 1300 provides, at least, the functions of receiving and reproducing the video production and of a client in client-server communications. One of skill in the art will recognize numerous structures of programmed or programmable logic also capable of performing these and other functions in accordance with aspects of the invention. Exemplary structures could include, for example, a programmed general purpose computer with suitable video hardware, an integrated receiver/client appliance such as a set-top box, and special purpose computing machinery comprising an application specific integrated circuit (ASIC). Structures currently commercially available which provide at least the above-identified functions include, for example, a WEBTV Plus set-top box available from WebTV Networks, Inc. of Palo Alto, Calif., U.S.A. It is contemplated, however, that the present invention will operate with other structures able to perform the above-identified functions (now known or later-developed). The remote control used with the WEBTV Plus set-top box is one example of a suitable form for the selection device 1700. Many others will be recognized by those of skill in the art including, for example, pointing devices used with personal computers, other selection systems such as those based on speech recognition, and touch-screen systems.

One of skill in the art will recognize other features incorporated in set-top boxes with which aspects of the invention may operated. Other features may include, for example, a card reader (not shown). The card reader may read identification or financial information cards and the identification or financial information may be used with selectable actions according to the invention. The card reader may work with smart cards, and stored-value cards; in embodiments in which a selectable action includes transfer of value. The card reader may be used to read information from a card for payment of value.

Preferably, the reproducing apparatus 1300 communicates with the display 1200 and the data network 1400. In operation, the video production communicating device 1800 communicates the video production 1100 to the reproducing apparatus 1300. A trigger interpreter 1330 interprets triggers in the video production 1100 such as those in the second trigger zone 1140 or the Nth trigger zone 1160. The trigger interpreter 1330 sends a request 1340 via the data network 1400. The request 1340 is received by the action resource provider 1500. The request 1340 may be handled as desribed in a patent application entitled, "A Method, Apparatus, and System for Indexical Triggers in Enhanced Video Productions," filed concurrently herewith, by inventors Todd Lash, Jay Weber, and David Kaiser. If an action selection interface is available for the particular trigger, an ASI indication 1360 is communicated via the data network 1400 to the reproducing apparatus 1300. An ASI interpreter 1320 parses the ASI indication 1360 and communicates a visual indication of the ASI indication 1360 to a content integrator 1310. The content integrator 1310 integrates the visual portions of the video production 1100 and visuals from the ASI interpreter 1320; the integrated visual may then be communicated to the display 1200.

When an ASI characterization 1380 is available for a particular trigger, it is communicated via the data network 1400 to the ASI interpreter 1320 in the reproducing apparatus 1300 as well. The ASI interpreter 1320 parses the ASI characterization 1380 and renders a visual representation thereof which is communicated to the content integrator 1310 for communication to the display 1200.

In an illustrative embodiment of the invention the indication of the availability of an ASI is a one which is rendered as a visual image on the display 1200. In other embodiments the indication of the availability of an ASI may be audio. In still other embodiments, it may not be communicated to the display 1200. More, generally, the indication of the availability of an ASI may be a portion of the characterization of the ASI itself. In embodiments of the invention where the action resource provider 1500 is an HTTP server using the HTTP protocol, the indication of the availability of an ASI may be, for example, all, or a portion, of an HTTP Response Message sent after the action resource provider 1500 received and interpreted an HTTP Request Message.

The ASI characterization 1380, generally, provides a characterization of an interface which may be parsed and rendered by the reproducing apparatus 1300 to provided one or more selectable actions. Preferably, the ASI characterization 1380 is also communicated using the HTTP protocol and the ASI characterization 1380 is preferably an HTML page which, typically, includes HTML extension tags for use with interactive television. One method of providing selectable actions is to provided links to action resources. However, the selectable actions may be implemented using other conventional client-side or client-server techniques. Action resources may be implemented using well-known programming methods. Conveniently, internet programming methods may be used and an action resource may be implemented with, for example, HTML pages, XML pages; CGI scripts or programs, servlets or other server-side scripts or programs; client-side scripts, applications or applets, or active controls; and other client-server methodologies. One of skill, having the desired functions of the action resource, will apprehend how it could be made or used with conventional programming methods.

Figure 4:
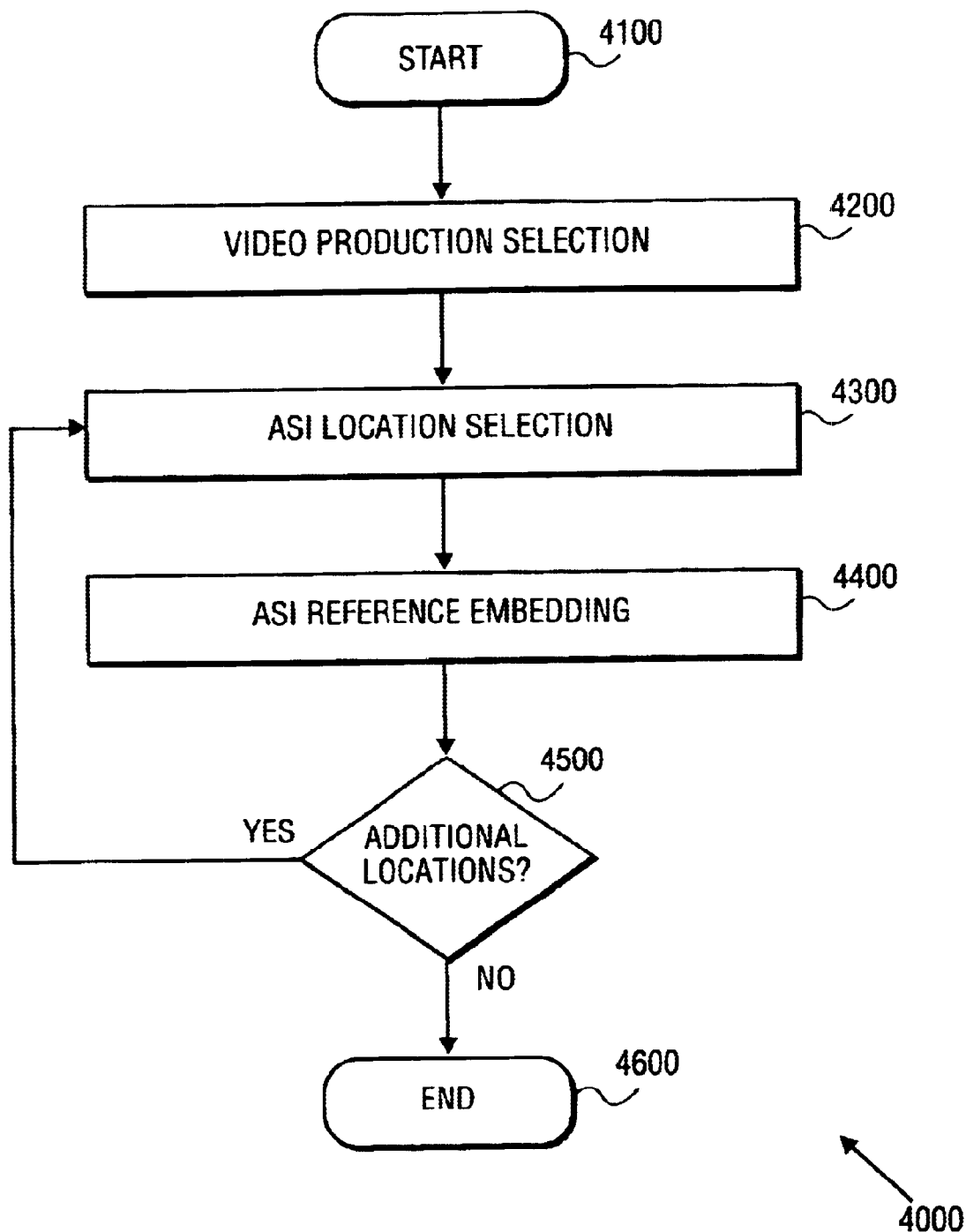
FIG. 4 depicts a flow diagram for a method of creating a video production including a placement zone and a trigger zone and comprising an image referencing a product and having a selectable action available for communication to a reproducing apparatus in accordance with an illustrative embodiment.

FIG. 4 depicts a flow diagram of a 'reference embedding' method 4000 in accordance with the illustrative embodiment. From a 'start' terminal 4100 processing continues to a 'video production selection' procedure 4200. The 'video production selection' procedure 4200 entails selecting a video production, such as the video production 1100. Preferably, the video production 1100 already contains one or more images referencing one or more products, however, the additional step of embedding one or more images referencing one or more products may be performed using conventional video editing methods. Next an 'ASI location selection' procedure 4300 is entered in which locations, such as the second placement zone 1130 or the Nth placement zone 1150 are selected as locations in the video production 1100 where action selection interfaces are desired to be provided. Then, an 'ASI reference embedding' procedure 4400 commences in which a reference to an action selection interface is embedded in the video production 1100 at, for example, the second trigger zone 1140 or the Nth trigger zone 1160. In an illustrative embodiment, the reference is a trigger such as that described above.

Process flow continues to an 'additional locations' decision procedure 4500. If it desired to select additional locations in the video production 1100 at which action selection interfaces could be made available, the 'additional locations' decision procedure 4500 exits through its 'yes' branch and process flow returns to the 'ASI location selection' procedure 4300 for another iteration. Otherwise, the 'additional locations' decision procedure 4500 exits thorough its 'no' branch and the 'reference embedding' method 4000 completes through an 'end' terminal 4600.

Figure 5:
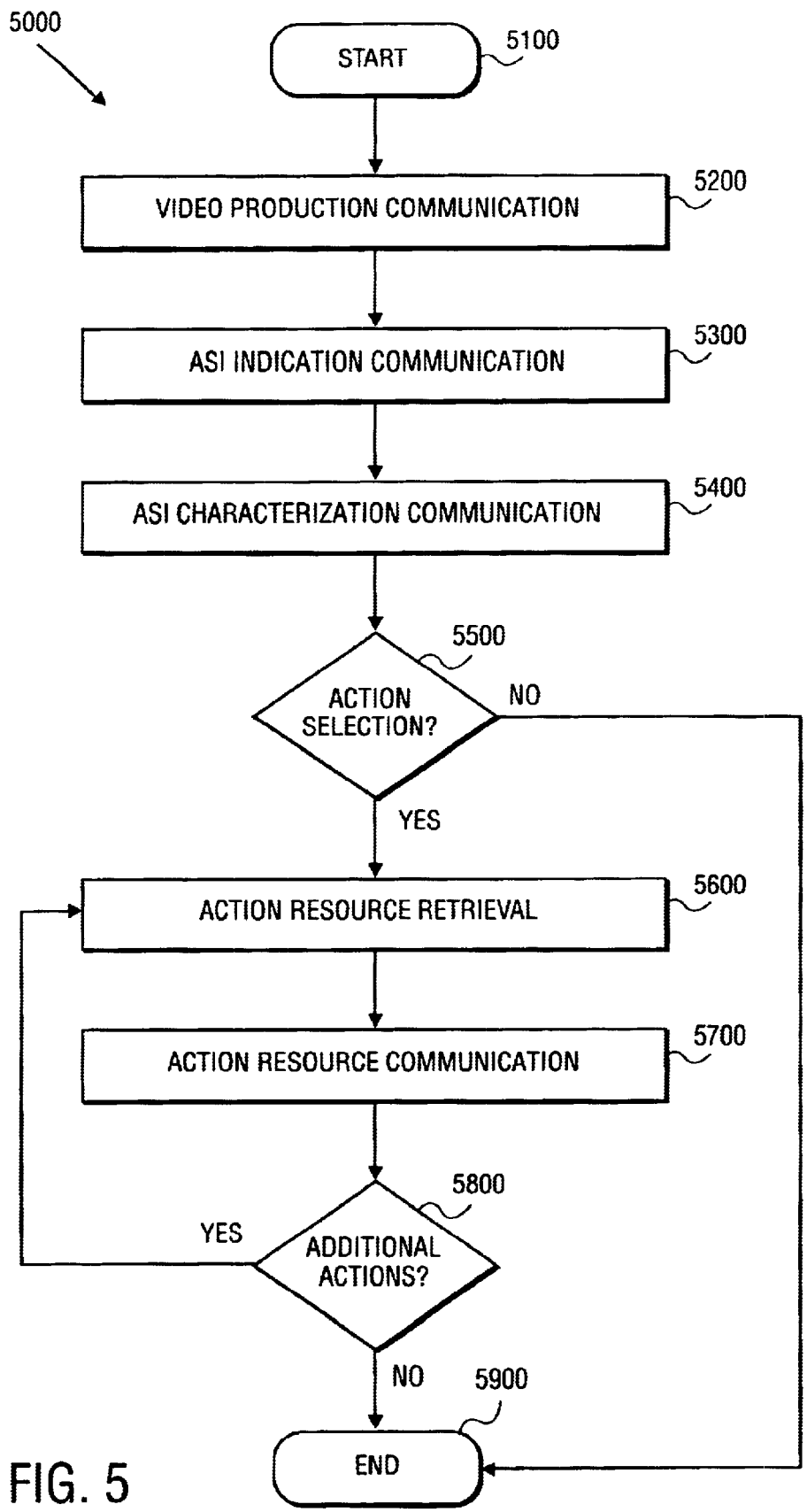
FIG. 5 depicts a flow diagram for a method of providing action selections to an image referencing a product in a video production in accordance with an illustrative embodiment.

Shown in FIG. 5 is a flow diagram of a 'viewer action session' method 5000 in accordance with an illustrative embodiment. Process flow initiates at a 'start' terminal 5100 and continues to a 'video production communication' procedure 5200. The 'video production communication' procedure 5200 involves communication of a video production such as the video production 1100 from the video production communicating device 1800 to the reproducing apparatus 1300. During reproduction of the first trigger zone 1120 when a trigger is encountered the request 1340 is sent and an 'ASI indication communication' procedure 5300 executed by which the ASI indication 1360 is communicated to the reproducing apparatus 1300. Next, an 'ASI characterization communication' procedure 5400 communicates the ASI characterization 1380 to the reproducing apparatus 1300. The ASI characterization 1380 is parsed, rendered, integrated with other visuals, and communicated to the reproducing apparatus 1300. A user (not shown) may then select one or more selectable actions from the action selection interface as displayed on the display 1200. An 'action selection' decision procedure 5500 exits through its 'yes' branch if the user selects one of the selectable action and process flow continues to an 'action resource retrieval' procedure 5600. In the 'action resource retrieval' procedure 5600 an action resource is retrieved from the action resource provider 1500 and that communicated to the reproducing apparatus 1300 via the data network 1400 in an 'action resource communication' procedure 5700. The ASI interpreter 1320 parses and renders visuals aspects of the action resource. Next, an 'additional actions' decision procedure 5800 exits through its 'yes' branch if the user selects additional actions and process flow returns to the 'action resource retrieval' procedure 5600. If no action was selected in the 'action selection' decision procedure 5500 or if an additional action is not selected in the 'additional actions' decision procedure 5800 process flow completes through an 'end' terminal 5900.

Figure 6A:
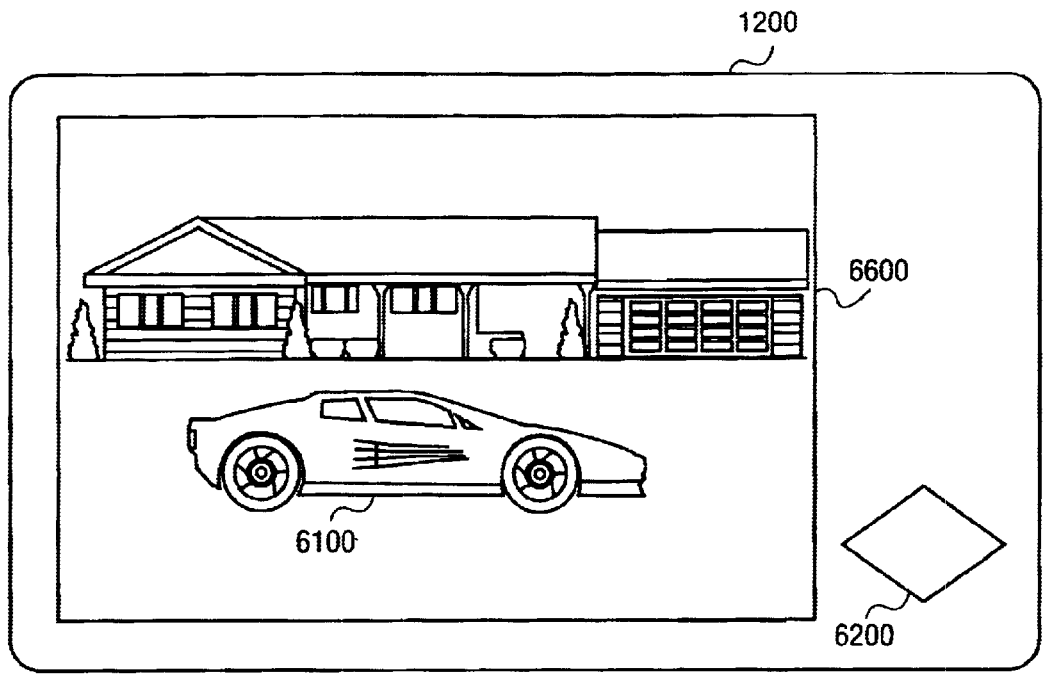
FIG. 6A depicts a displayed view of an indication that an action selection interface is available in accordance with an illustrative embodiment.

A viewer's perspective of the display 1200 will now be provided to further illustrate aspects of the illustrative embodiment. Shown in FIG. 6A are the display 1200 and an image referencing a product 6100. As noted above, the image referencing a product 6100 may refer either directly or indirectly to the product. Thus, for example, if the image referencing a product 6100 were an image of a car, the referenced product could be the car or, for example, car insurance services, car quality certification, or a car vending collective.

Also shown in FIG. 6A is a visual indication of the availability of an ASI 6200. As noted above, the indication of the availability of an ASI may be rendered as a visual image on the display 1200 while in other embodiments the indication of the availability of an ASI may be in other forms. In accordance with the illustrative embodiment the visual indication of the availability of an ASI 6200 could be provided with an HTML page with television extension tags which render the video production 6600 in one portion of the display 1200, and the visual indication of the availability of an ASI 6200 in another.

Figure 6B:
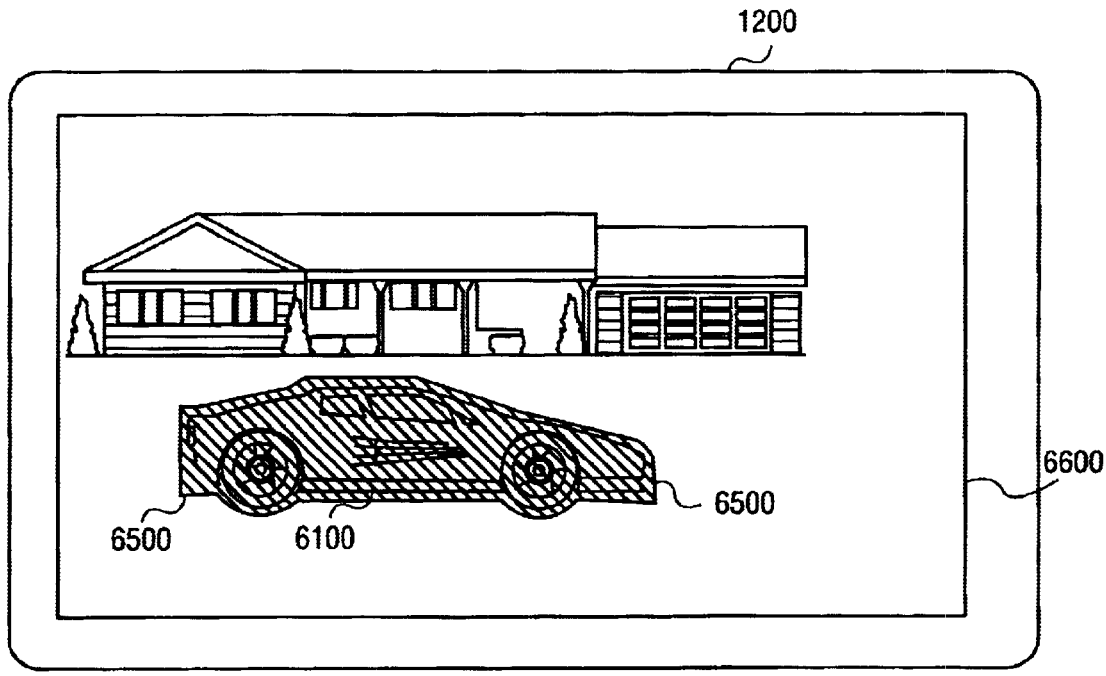
FIG. 6B depicts a displayed view of a visual highlight as an indication that an action selection interface is available in accordance with an illustrative embodiment.

An alternative manner of providing the visual indication of the availability of an ASI 6200 is depicted in FIG. 6B where a visual highlight 6500 of the image referencing a product 6100 is shown. The visual highlight 6500 may be an image edited to highlight the image referencing a product 6100 which may be tracked through multiple frames of the video production 6600. Conveniently the visual highlight 6500 may be implemented with an HTML table. The height and width of the table and its cells are suitably selected for the size of the visual highlight 6500 of the image referencing a product 6100. An image providing the visual highlight 6500 is located in one cell of the table. In some embodiments, the height and width of the cell are adjusted to locate the upper left corner of the visual highlight 6500 image. As the image referencing a product 6100 moves during the video production, the upper left corner of the visual highlight 6500 may be made to track the image referencing a product 6100 by adjusting the height and width of the cell in which the visual highlight 6500 is located. Accordingly, an additional aspect of some embodiments of the invention is a method for tracking an image in a video production with an overlay image.

In some embodiments of the invention the action resource provider 1500 detects if the reproducing apparatus 1300 is able to support a type of selectable action in an action selection interface from information in the request 1340 for example, a user-agent header field. In some of these embodiments the visual highlight 6500 is communicated to the reproducing apparatus 1300 only if the reproducing apparatus 1300 supports the selectable action in the action selection interface.

Figure 6C:
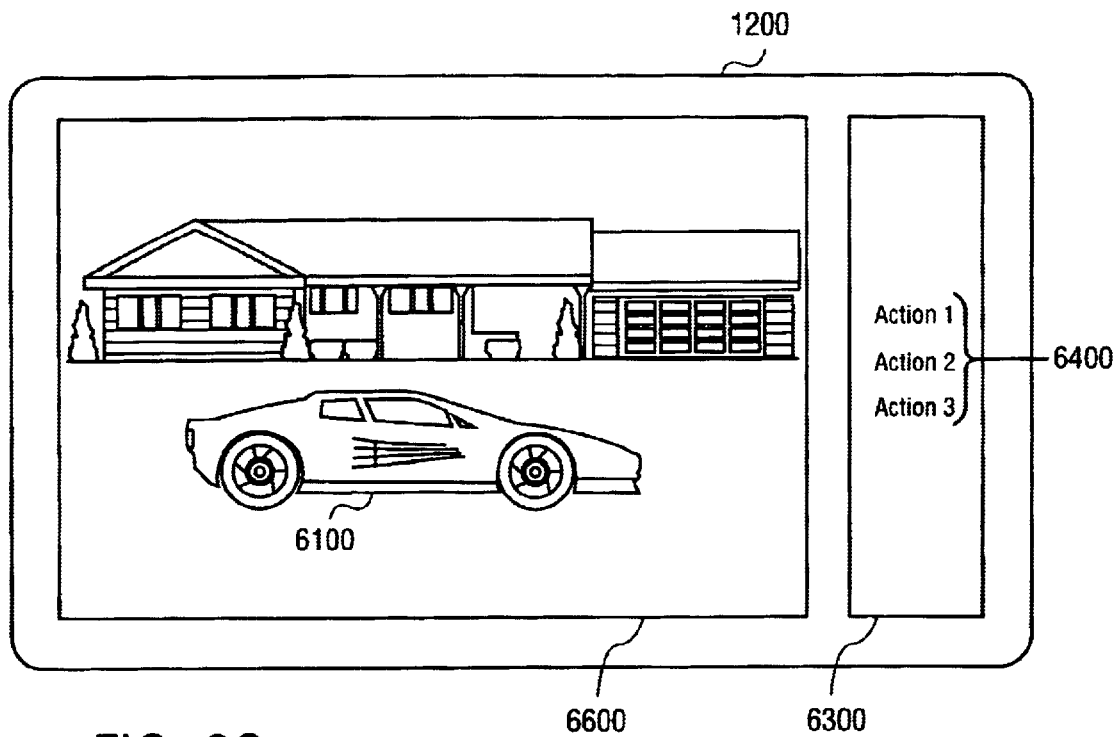
FIG. 6C depicts a displayed view of a rendered characterization of an action selection interface in accordance with an illustrative embodiment.
Figure 6D:
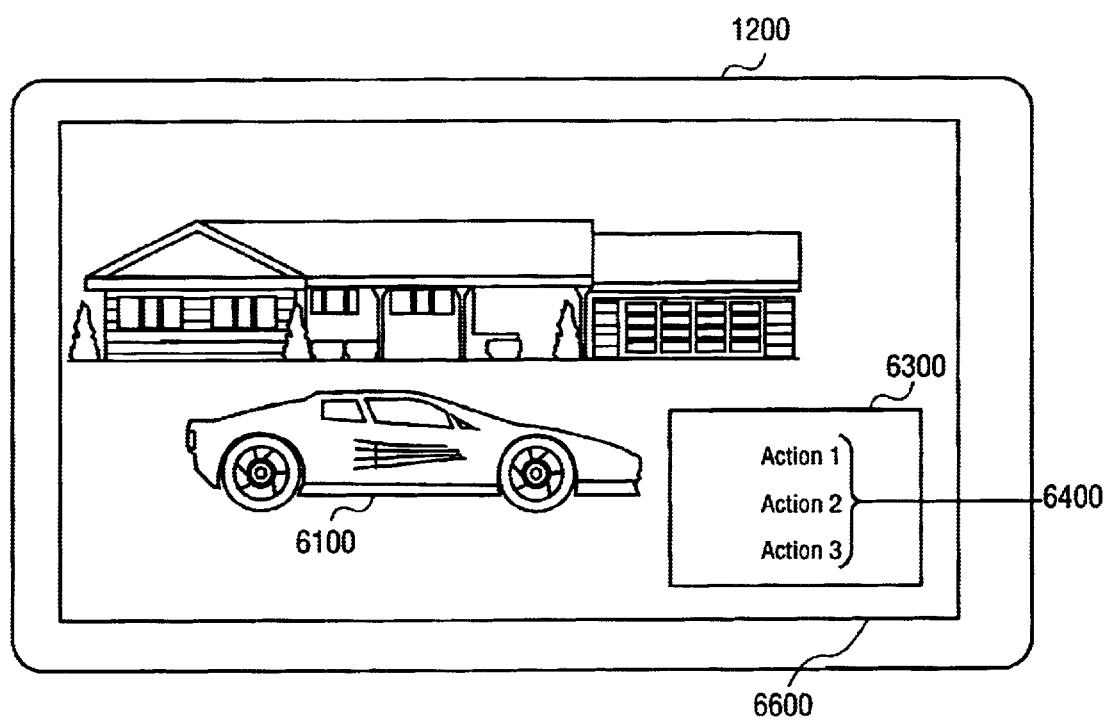
FIG. 6D depicts a displayed view of a rendered characterization of an action selection interface in accordance with an illustrative embodiment.

Shown in FIG. 6C and FIG. 6D are the display 1200, the image referencing a product 6100 and a rendered characterization of an action selection interface 6300. While the rendered characterization of an action selection interface 6300 is generically depicted, one of ordinary skill in the art will appreciated that it may be as complex as can be parsed and rendered by the reproducing apparatus 1300. As depicted, the rendered characterization of an action selection interface 6300 comprises the plurality of selectable actions 6400 which may be selected by a user with, for example, the selection device 1700. As shown in FIG. 6C the rendered characterization of an action selection interface 6300 appears in a portion of the display 1200 separate from the video production 6600. However, as depicted in FIG. 6D, the rendered characterization of an action selection interface 6300 may appear in the same portion of the display 1200 as the video production 6600. One skilled in the art will quickly appreciate that the views in FIG. 6A, FIG. 6B, FIG. 6C, and FIG. 6D are illustrative and not limiting, rather one of skill will be able to make and use other configurations of the elements in the aforementioned figures.

The selectable actions in the plurality of selectable actions 6400 may be any action susceptible to implementation in the action resource provider 1500 and the reproducing apparatus 1300.

Figure 7:
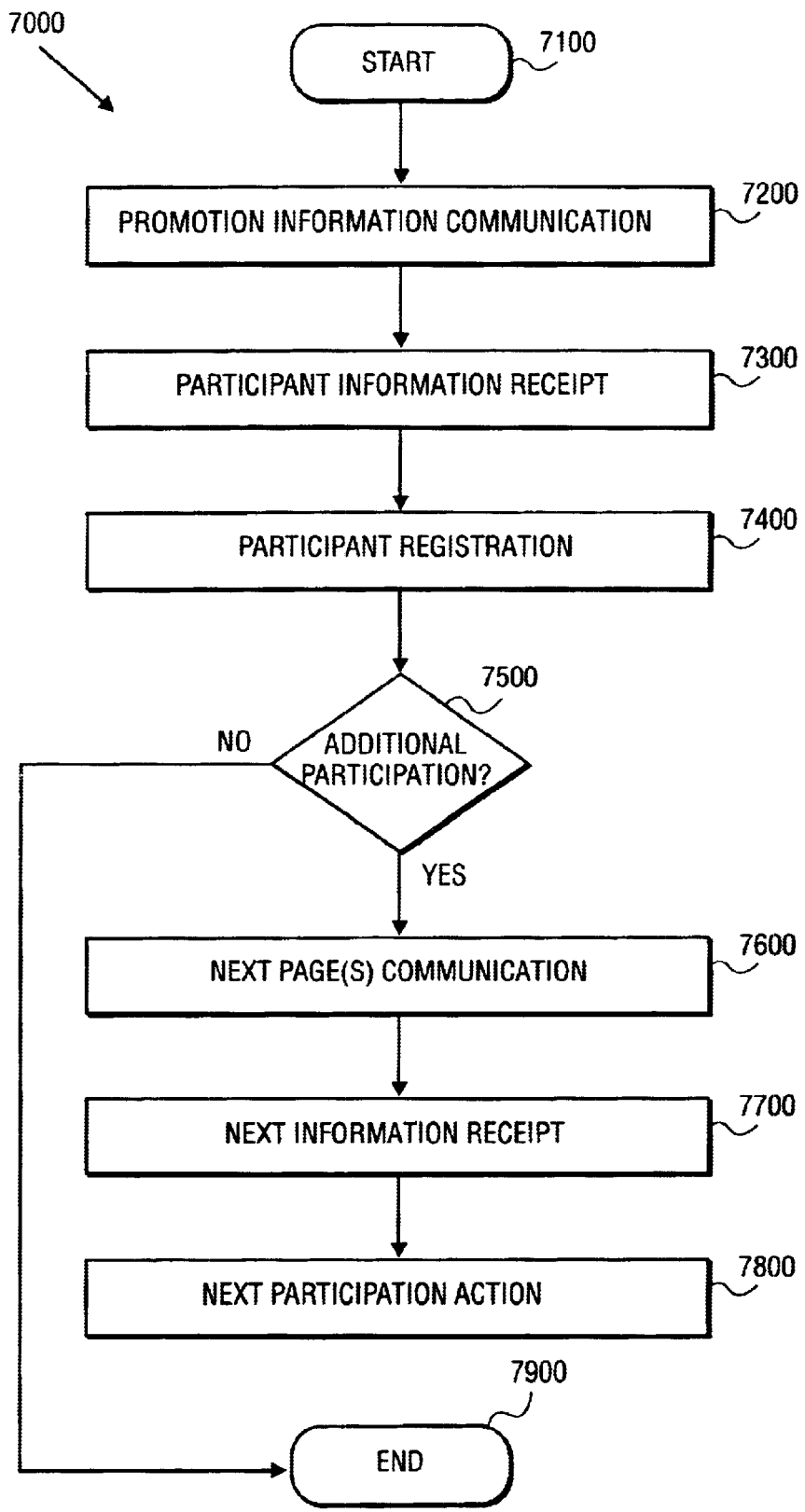
FIG. 7 depicts a flow diagram for a method of implementing a promotion participation action in accordance with an illustrative embodiment.
Figure 8:
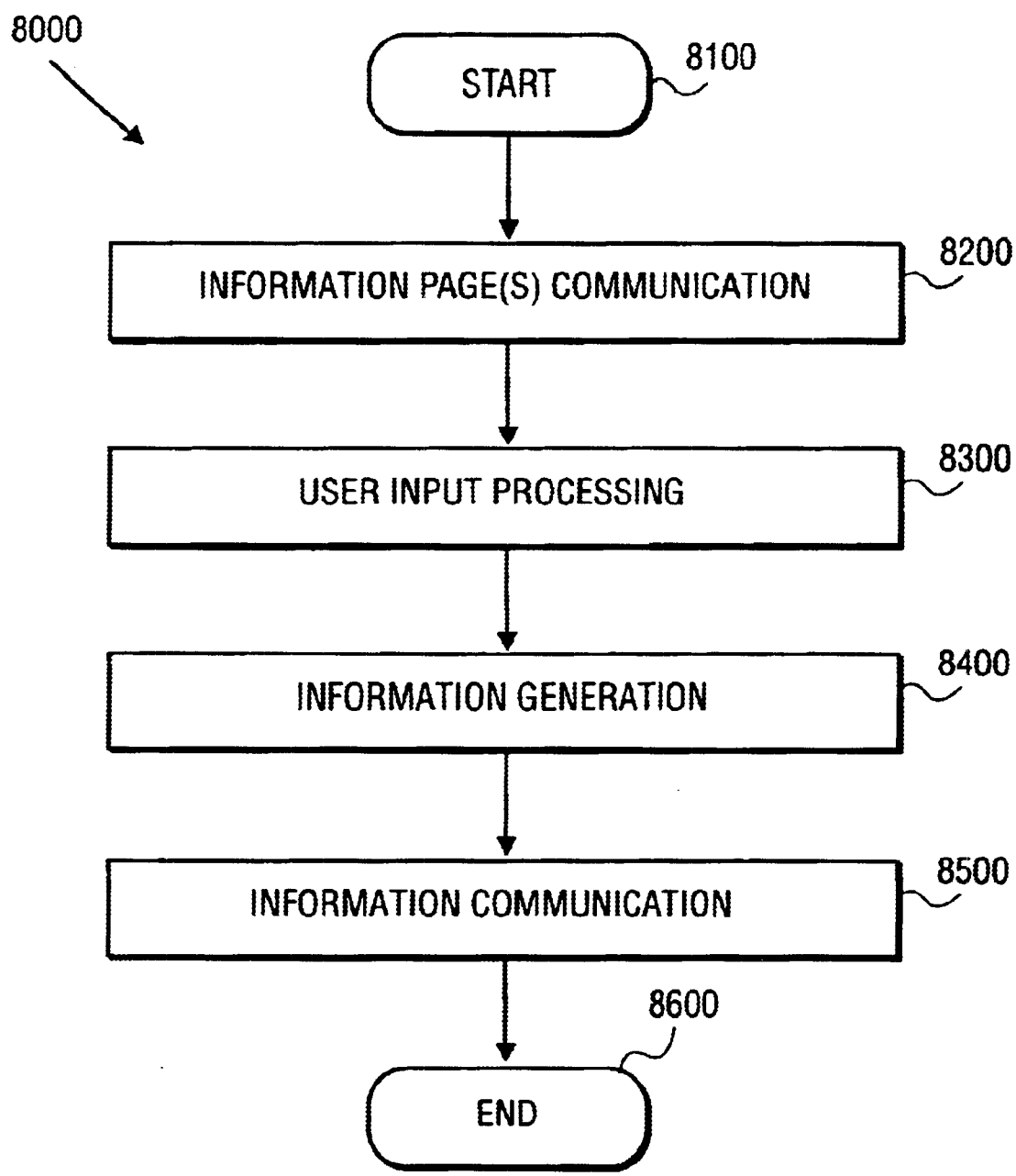
FIG. 8 depicts a flow diagram for a method of implementing a information request action in accordance with an illustrative embodiment.
Figure 9:
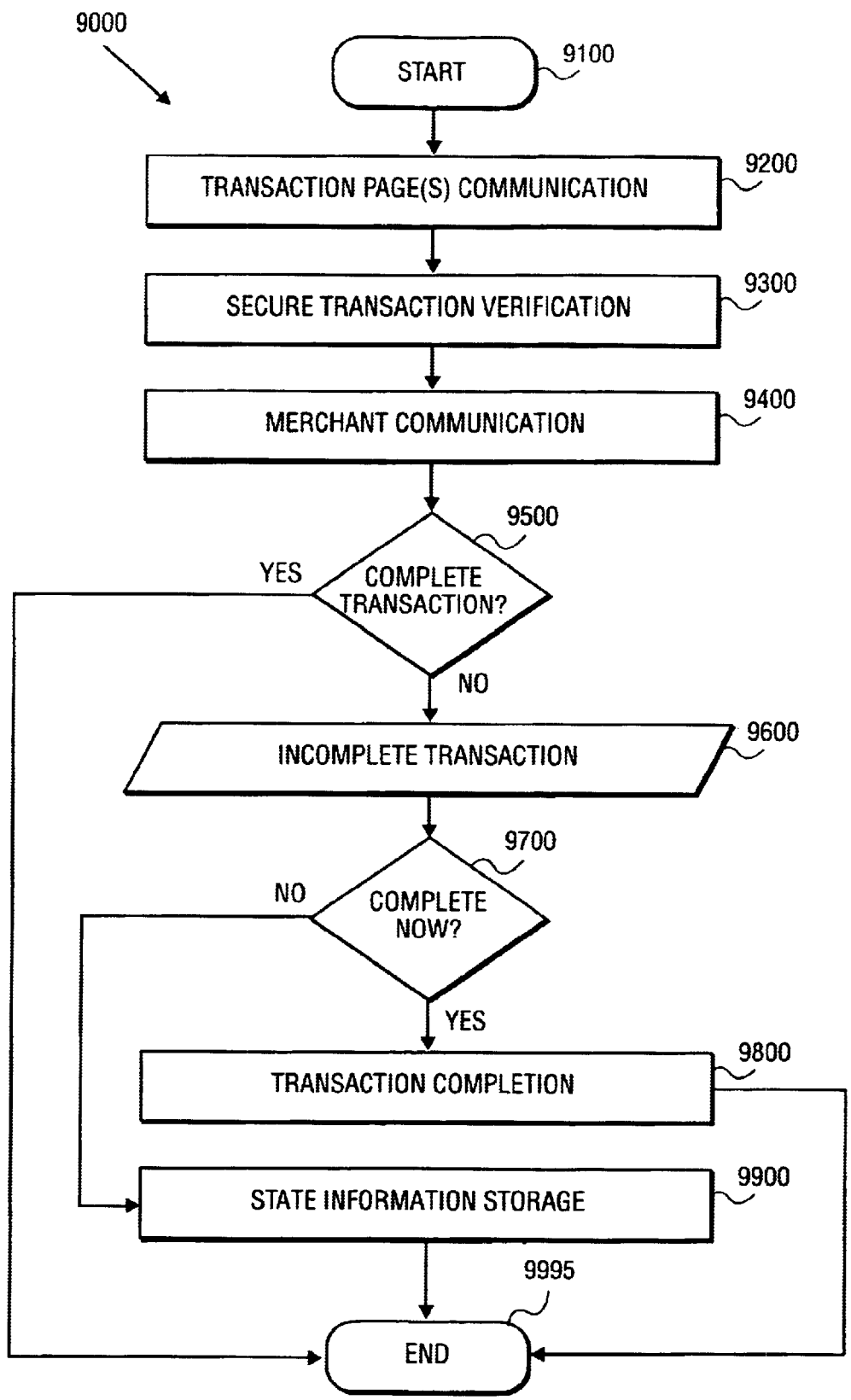
FIG. 9 depicts a flow diagram for a method of implementing a product purchase action in accordance with an illustrative embodiment.

To further illustrate aspects of the invention, FIG. 7, FIG. 8, and FIG. 9 depict methods for implementing exemplary selectable actions. One of skill in the art will quickly appreciate that these are illustrative and not limiting of the scope of the invention. Rather, one skilled in the art will recognize numerous other selectable actions operable with the invention.

One selectable action is a promotion participation action. Conveniently the promotion participation action is a link to action resources which implements the promotion participation action. Further illustrative detail of an may be found in FIG. 7 where a promotion participation action method 7000 is depicted. Functions described in the promotion participation action method 7000 may be implemented with, for example, HTML pages, XML pages; CGI scripts or programs, servlets or other server-side scripts or programs; client-side scripts, applications or applets, or active controls; and other client-server methodologies. Processing initiates at a 'start' terminal 7100 and continues to a 'promotion information communication' procedure 7200 which communicates information about the promotion participation action to the reproducing apparatus 1300. Next, a 'participant information receipt' procedure 7300 stores information communicated by a user of the reproducing apparatus 1300 relevant to participation in the promotion and processing continues to a 'participant registration' procedure 7400. The 'participant registration' procedure 7400 completes the basic information exchange for a promotion participation which may involve data interchange with other servers (not shown), for example those operated by the promoting entity or affiliate. An 'additional participation' decision procedure 7500 allows a participant to select participation in additional aspects of the promotion. Additional participation options may be communicated to the reproducing apparatus 1300 which a user views on the display 1200.

If the user does not wish to engage in additional aspects of the promotion, the 'additional participation' decision procedure 7500 exits through its 'no' branch and processing completes through an 'end' terminal 7900. Otherwise, the 'additional participation' decision procedure 7500 exits through its 'yes' branch and a 'next page(s) communication' procedure 7600 communicates one or more pages to the reproducing apparatus 1300 for the participant. A 'next information receipt' procedure 7700 receives additional information as necessary or desired from the participant and processing continues to a 'next participation action' procedure 7800 which performs one or more additional participation actions. These may include, for example, information exchange or storage with a promoting entity or affiliate. It may be desirable for additional participation options to be offered, and processing returns to the 'additional participation' decision procedure 7500 through which such additional participation may begin.

Another selectable action is a information request action. Conveniently the information request action is a link to action resources which implements the information request action. Further illustrative detail of an may be found in FIG. 8 where an information request action method 8000 is depicted. Functions described in the information request action method 8000 may be implemented, for example, with HTML pages, XML pages; CGI scripts or programs, servlets or other server-side scripts or programs; client-side scripts, applications or applets, or active controls; and other client-server methodologies. Processing for the information request action method 8000 initiates at a 'start' terminal 8100 and continues to a 'information page(s) communication' procedure 8200 in which one or more pages are communicated to the reproducing apparatus 1300 for communication to the display 1200. Commonly, plural informational options are presented to a user. A 'user input processing' procedure 8300 receives indication of user selections from the reproducing apparatus 1300 and performs any transformations convenient in extracting or reporting aspects of the user selections. In addition, the 'user input processing' procedure 8300 may also log, for example, user data or information request data. Then an 'information generation' procedure 8400 generates information output for reporting to the user. The 'information generation' procedure 8400 may employ any of many known report generation or extraction methods to produce the requested information for presentation to the user. An 'information communication' procedure 8500 then communicates requested information to the user. The requested information may be communicated to the user via the reproducing apparatus 1300 and the display 1200 or be communicated through other methods including, for example, by post or facsimile. The information request action method 8000 completes through an 'end' terminal 8600.

Another selectable action is a product purchase action. Conveniently the product purchase action is a link to action resources which implements the product purchase action. Further illustrative detail of an may be found in FIG. 9 where a product purchase action method 9000 is depicted. Functions described in the product purchase action method 9000 may be implemented, for example, with HTML pages, XML pages; CGI scripts or programs, servlets or other server-side scripts or programs; client-side scripts, applications or applets, or active controls; and other client-server methodologies. One of skill having the benefit of this disclosure will appreciate that many known and commercially available electronic commerce systems may be used to perform aspects of the product purchase action method 9000. Processing in the product purchase action method 9000 initiates at a 'start' terminal 9100 and continues to a 'transaction page(s) communication' procedure 9200 in which pages used to present the product purchase transaction are communicated to the reproducing apparatus 1300 for rendering on the display 1200. Upon user input of transaction information a 'secure transaction verification' procedure 9300 verifies transaction information with a transaction security verification mechanism. One of skill in the art will recognize many transaction security verification mechanisms. Conveniently, a predetermined identification number personal to the user may be used.

Next, a 'merchant communication' procedure 9400 communicates transaction information from the user and product information to a merchant. The merchant may or may not have received sufficient information to complete the transaction depending on the particular requirements of the merchant or transaction. A 'complete transaction' decision procedure 9500 exits through it s 'yes' branch if the 'merchant communication' procedure 9400 returns an indication that the transaction was completed. This is communicated to the user and processing completes through an 'end' terminal 9995.

If the transaction could not be complete, the 'complete transaction' decision procedure 9500 exits through its 'no' branch and an 'incomplete transaction' output block 9600 reports to the user that the transaction could not be completed at the current time on the basis of the information thus far received. A 'complete now' decision procedure 9700 prompts the user if they wish to complete the transaction now. If so, the 'complete now' decision procedure 9700 exits through its 'yes' branch and a 'transaction completion' procedure 9800 completes the rest of the transaction. Processing then completes through the 'end' terminal 9995.

If the user does not wish to complete the transaction at the current time, the 'complete now' decision procedure 9700 exits through its 'no' branch and a 'state information storage' procedure 9900 stores information about the current state of the transaction for later completion by the user. Processing completes though the 'end' terminal 9995.

Figure 10:
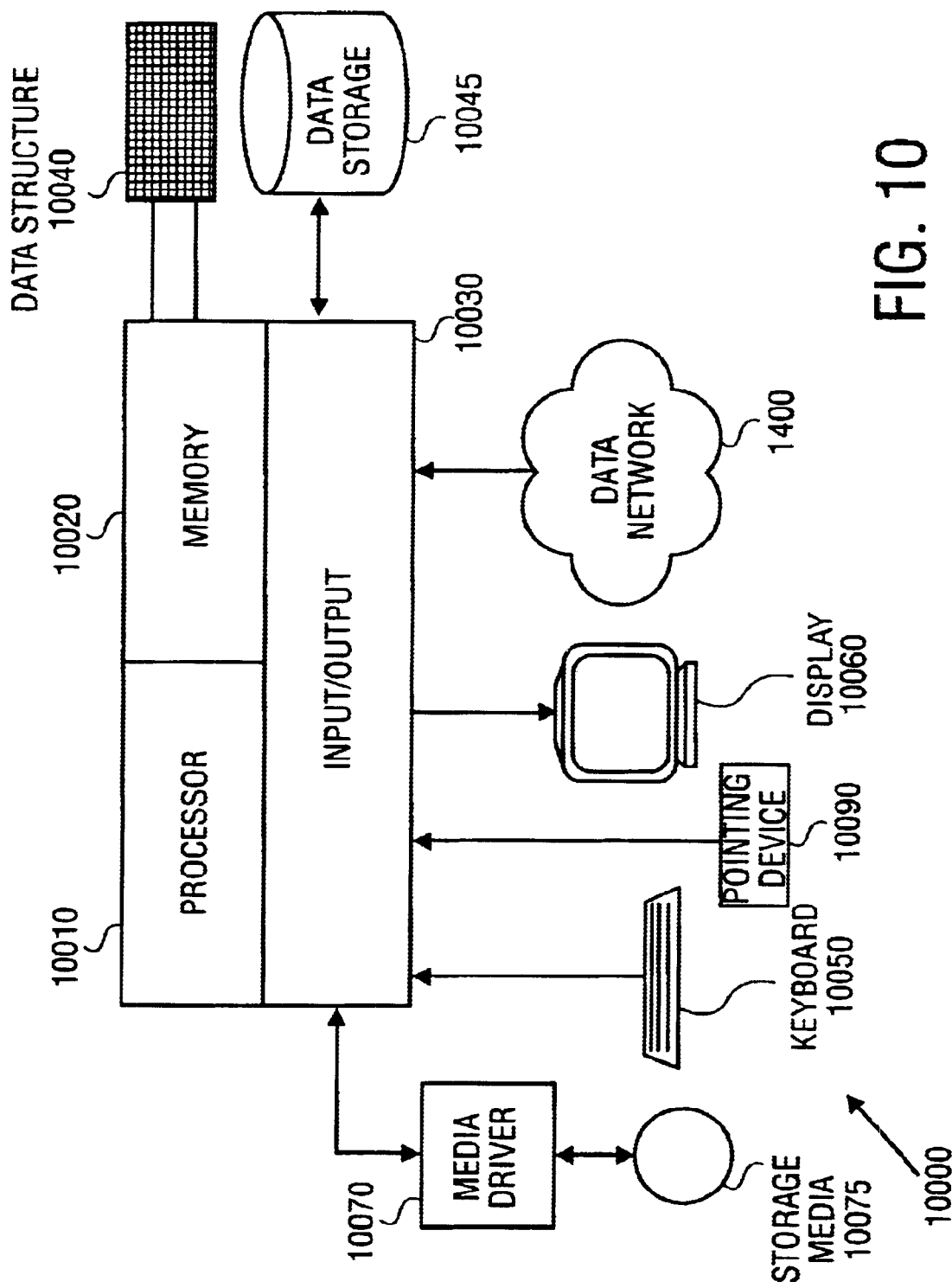
FIG. 10 depicts a computer system capable of being configured to embody aspects of the invention in accordance with an illustrative embodiment.

Methods according to the invention may be computer implemented either in whole or in part. FIG. 10 depicts a computer system 10000 capable of embodying aspects of the invention. The action resource provider 1500 may be structures in accordance with the computer system 10000. The computer system 10000 comprises a microprocessor 10010, a memory 10020 and an input/output system 10030. The memory 10020 is capable of being configured to provide a data structure 10040 which may contain data manipulated by the computer system 10000 when embodying aspects of the invention. Further illustrated is a media drive 10070, such as a disk drive, CD-ROM drive, or the like. The media drive 10070 may operate with a computer-usable storage medium 10075 capable of storing computer-readable program code able to configure the computer system 10000 to embody aspects of the invention. The input/output system 10030 may also operate with a keyboard 10050, a display 10060, a pointing device 10090, a data storage 10045, or a network such as the data network 1400. As illustrated, the computer system 10000 is general-purpose computing machinery. As one of skill recognizes programmed instructions may configure general purpose computing machinery to embody structures capable of performing functions in accordance with aspects of the invention. Special purpose computing machinery including, for example, an application specific integrated circuit (ASIC) may also be used. One skilled in the art will recognize numerous structures of programmed or programmable logic capable of being configured to embody aspects of the invention. In some embodiments, the computer system 10000 is a SPARC-based workstation from Sun Microsystemns of Mountain View, Calif., running the SOLARIS operating system and the Apache HTTP server with a Secure Sockets Layer module.

In illustrative embodiments of the invention, computer program code configures a computer to embody aspects of the invention. So configured, representations of physical quantities and characteristics are manipulated through a series of operations to achieve aspects of a method, apparatus, and system for providing action selections to an image referencing a product in a video production. One skilled in the art will appreciate the distinction between the manipulation of physical quantities and representations thereof within a computer and will quickly apprehend when reference is being made to one or the other.

In some illustrative embodiments, the action resource provider 1500 is a computer system similar to the computer system 10000 and runs an HTTP server. However, one skilled in the art will appreciate that the action resource provider 1500 could be other devices with which the reproducing apparatus 1300 is configured to operate. In the illustrative embodiment the action resource provider 1500 communicates with a data storage 1600. The data storage 1600 may store, for example, user profile data, product data, merchant data logs, or program guides User profile data may contain information useful to customizing content and following through on information request, promotion participation, product purchase actions, and other selectable actions. This includes both information explicitly supplied by the user or taken from service registration data, and information derived from the user's pattern of usage. In an illustrative embodiment, explicit data includes name, address, phone number, birthdate, preferred payment methods, billing address, income, and sex. Usage data may include shows watched, the frequency of performing the different interactive actions, show loyalties, and Web sites visited. A preferred mode of using the user profile data to customize content will conveniently involve first deriving intermediate data. For example, it is simpler to derive an age, or an age group, rather than directly customizing from birthdate. Thus the user profile may include the results of calculations and aggregations of data values to create a smaller and therefore more manageable space of content variations.

Although the present invention has been described in terms of illustrative embodiments, one skilled in the art will understand that various modifications and alterations may be made without departing from the scope of the invention. Accordingly, the scope of the invention is not to be limited to the particular embodiments discussed herein, but should be defined only by the appended claims and equivalents thereof.

All patents, patent applications, documents, standards, protocols, and draft protocols referred to herein are incorporated herein by this reference in their entirety.

What is claimed is:

1. A method for providing action selections to an image referencing a product in a video production, said method comprising:

communicating a video production to a reproducing apparatus, said video production comprising a placement zone and a trigger zone at least partially coincident with said placement zone, wherein said trigger zone comprises a trigger resource identifier, and wherein said placement zone comprises an image referencing a product;

communicating to said reproducing apparatus an indication that an action selection interface associated with said product is available in response to a request corresponding to a trigger in said trigger zone, the visual indication is communicated to said reproducing apparatus only if said reproducing apparatus supports a type of selectable action in said action selection interface;

communicating to said reproducing apparatus a characterization of said action selection interface, wherein said characterization of said action selection interface comprises at least one selectable action associated with the product and wherein the characterization of said action selection interface is integrated with the video production prior to being communicated to the reproducing apparatus.

2. The method according to claim 1 further comprising:

receiving an indication of the selection of said selectable action;

retrieving an action resource associated with said selectable action; and communicating said action resource to said reproducing apparatus.

3. The method according to claim 1 wherein said video production is communicated over a television network.

4. The method according to claim 1 wherein said video production is distributed in a tangible medium.

5. The method according to claim 1 wherein said video production is transferred over a computer network.

6. The method according to claim 1 wherein said indication of said action selection interface comprises a visual highlight.

7. The method according to claim 6 wherein said reproducing apparatus is coupled to a viewing device.

8. The method according to claim 1 wherein said selectable action comprises a product purchase action.

9. The method according to claim 1 wherein said selectable action comprises a promotion participation action.

10. The method according to claim 1 wherein said selectable action comprises an information request action.

11. The method according to claim 2 wherein said action resource is selected responsive to a profile of a user associated with said reproducing apparatus.

12. A method for creating a video production including a placement zone and a trigger zone and comprising an image referencing a product and having a selectable action available for communication to a reproducing apparatus, said method comprising:

selecting a placement zone in a video production, said placement zone comprising an image referencing a product;

selecting a trigger zone in said video production corresponding to said placement zone;

embedding a reference in said trigger zone in said video production to an action selection interface, wherein when reproduced on compatible equipment and communicated to a display, at least one selectable action in said action selection interface is selectable by a viewer, wherein the action selection interface is communicated to the display only if said reproducing apparatus supports a type of at least one selectable action in said action selection interface and wherein the action selection interface is integrated with the video production prior to being communicated to the reproducing apparatus.

13. The method according to claim 12 wherein said video production comprises a first track comprising said trigger zone and a second track comprising said placement zone, wherein said first and second tracks are synchronized.

14. Apparatus comprising a processor, a storage, and an input-output system, said apparatus configured for communication with a reproducing apparatus via a data network, programmed instructions configuring said apparatus to perform a method comprising:

receiving a request from a reproducing apparatus, said request corresponding to a trigger from a trigger zone in a video production communicated to said reproducing apparatus;

determining whether an action selection interface associated with said request is available; and communicating a characterization of said action selection interface to said reproducing apparatus if the reproducing apparatus supports a type of a selectable action of the action selection interface, wherein the characterization of the action selection interface is integrated with the video production.

15. A system for providing action selections to an image referencing a product in a video production and operable for use with a reproducing apparatus configured for communication with a display, a data network, and a selection device, comprising:

a video production communication device, said communication device communicating a video production comprising a placement zone and a trigger zone to said reproducing apparatus; and an action resource provider configured for communication with said reproducing apparatus via said data network, said action resource provider receiving a request from said reproducing apparatus corresponding to a trigger in said trigger zone of said video production, said action resource communicating a characterization of an action selection interface to said reproducing apparatus responsive to said request, said action selection interface comprising a selectable action, wherein the characterization of the action selection interface is communicated to the reproducing apparatus only if said reproducing apparatus supports a type of the selectable action in said action selection interface and wherein the characterization of said action selection interface is integrated with the video production and communicated to the reproducing apparatus.

16. The system according to claim 15 wherein said action resource provider further:

receives a request from said reproducing apparatus corresponding to said selectable action;

retrieves an action resource associated with said selectable action; and communicates an action resource associated with said selectable action to said reproducing apparatus.

* * * * *